C. B. STEBBINS.
CONTROL FOR DRIVING MECHANISMS.
APPLICATION FILED NOV. 13, 1908.

944,293.

Patented Dec. 28, 1909.

Witnesses
Clara E. Braden
Gertrude Tallman

Inventor
Charles B. Stebbins
By Chappell Earl
Attorneys

UNITED STATES PATENT OFFICE.

CHARLES B. STEBBINS, OF THREE RIVERS, MICHIGAN, ASSIGNOR TO SHEFFIELD CAR COMPANY, OF THREE RIVERS, MICHIGAN.

CONTROL FOR DRIVING MECHANISMS.

944,293.  Specification of Letters Patent.  Patented Dec. 28, 1909.

Application filed November 13, 1908. Serial No. 462,442.

*To all whom it may concern:*

Be it known that I, CHARLES B. STEBBINS, a citizen of the United States, residing at Three Rivers, St. Joseph county, Michigan, have invented certain new and useful Improvements in Controls for Driving Mechanisms, of which the following is a specification.

This invention relates to improvements in controls for driving mechanisms.

The main objects of this invention are: First, to provide a control for driving mechanisms by which the necessary movements for shifting or actuating the clutches in the transmission or driving gear are effected in proper relation to the shifting or actuating of the master clutch,—that is, the clutch which connects the engine or motor with the transmission. Second, to provide a control for driving mechanisms for motor cars, such as street cars, or railway motor cars, by which the mechanism can be effectively operated by the motorman on either platform. Third, to provide an improved control for the motor and driving mechanism of motor cars, which is easily and simply operated and is a safe-guard against carelessness on the part of the operator.

Further objects, and objects relating to structural details, will definitely appear from the detail description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which—

Fig. 3 is a detail tail view, partially in vertical section, on a line corresponding to line 3—3 of Fig. 1.

In the drawing, the sectional views are taken looking in the direction of the little arrows at the ends of the section lines, and similar numerals of reference refer to similar parts throughout the several views.

Referring to the drawing, 1 represents the floor of a car, 2 the engine or motor, 3 the transmission, 4 the crank shaft, 5 the carbureter, and 6 the commutator. These parts are all shown in conventional form and are illustrated herein to show the operative relation of the parts.

The control post standard 7 is arranged through the bottom of the car 1 and preferably supported thereon by means of a flange, as 8. I have not illustrated herein the particular form of transmission or the shifting clutches therefor, as they form no part of this invention, as it merely relates to the operating means therefor. In the accompanying drawing, the rock shafts 9 and 10 are for shifting the transmission clutches for varying the speed, and the rock shaft 11 is for shifting the master clutch or the clutch connection for the engine shaft of the transmission.

The rock shaft 9 in the structure illustrated in the accompanying drawing operates the transmission clutch which gives the low speed. The rock shaft 10 operates the transmission which gives the intermediate and the high speed, the structure illustrated being designed to control a three-speed transmission, the rock shaft 10 being thrown in one direction to give the high speed and in the other direction to give the intermediate speed. These rock shafts are provided with arms 12 and 13, respectively, which are connected by the links or connecting rods 14 and 15 to the levers 16 and 17, respectively. These levers 16 and 17 are mounted by means of the vertical pivot 18 on the bracket 19 carried by the cross piece 20 of the frame. The levers 16 and 17 are connected by the links 21 and 22 to the arms 23 and 24 on the tubular control posts or rock shafts 25 and 26, respectively. The object of interposing the levers 16 and 17 in the connections for the control post or rock shafts to the clutch rock shafts 9 and 10 is to bring the control post standard to the center of the car, and they have no special importance in the operation of the control except as connecting means.

Figure 1:
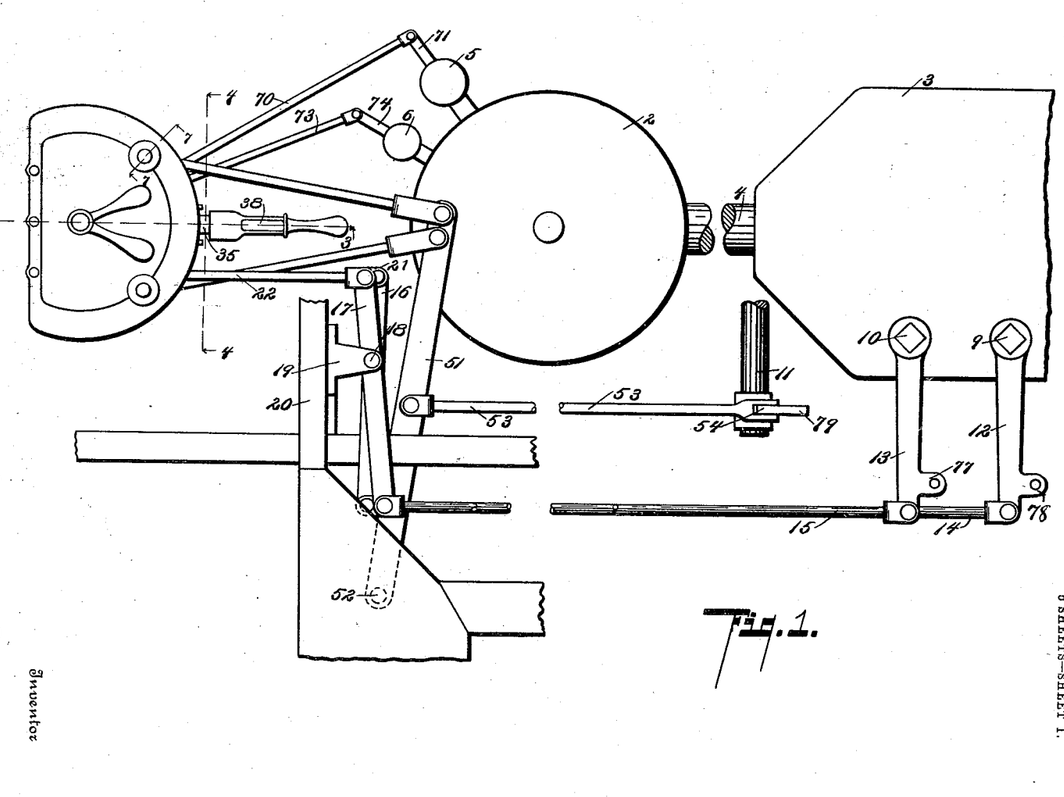
Figure 1 is a detail plan view of a structure embodying the features of my invention, the engine, transmission and the parts of the frame illustrated being shown in conventional form to show their operative relation.
Figure 2:
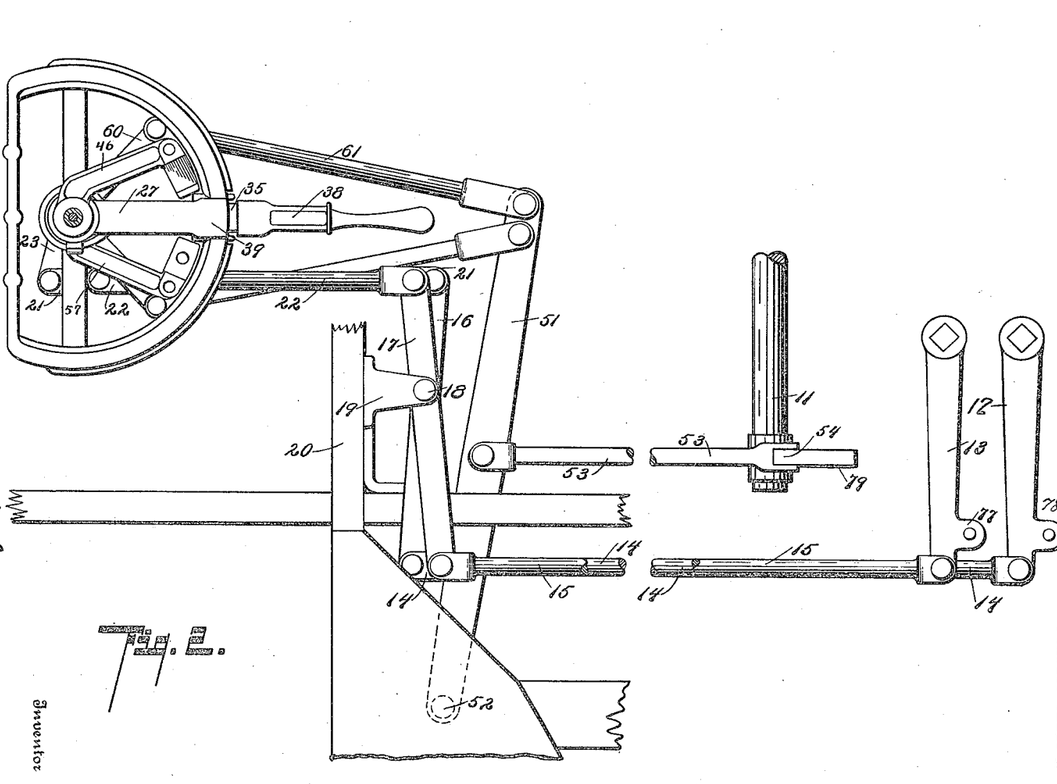
Fig. 2 is a detail view with the cap of the control post or standard head removed, sectioned on a line corresponding to line 2—2 of Figs. 3 and 6.
Figures 4, 6:
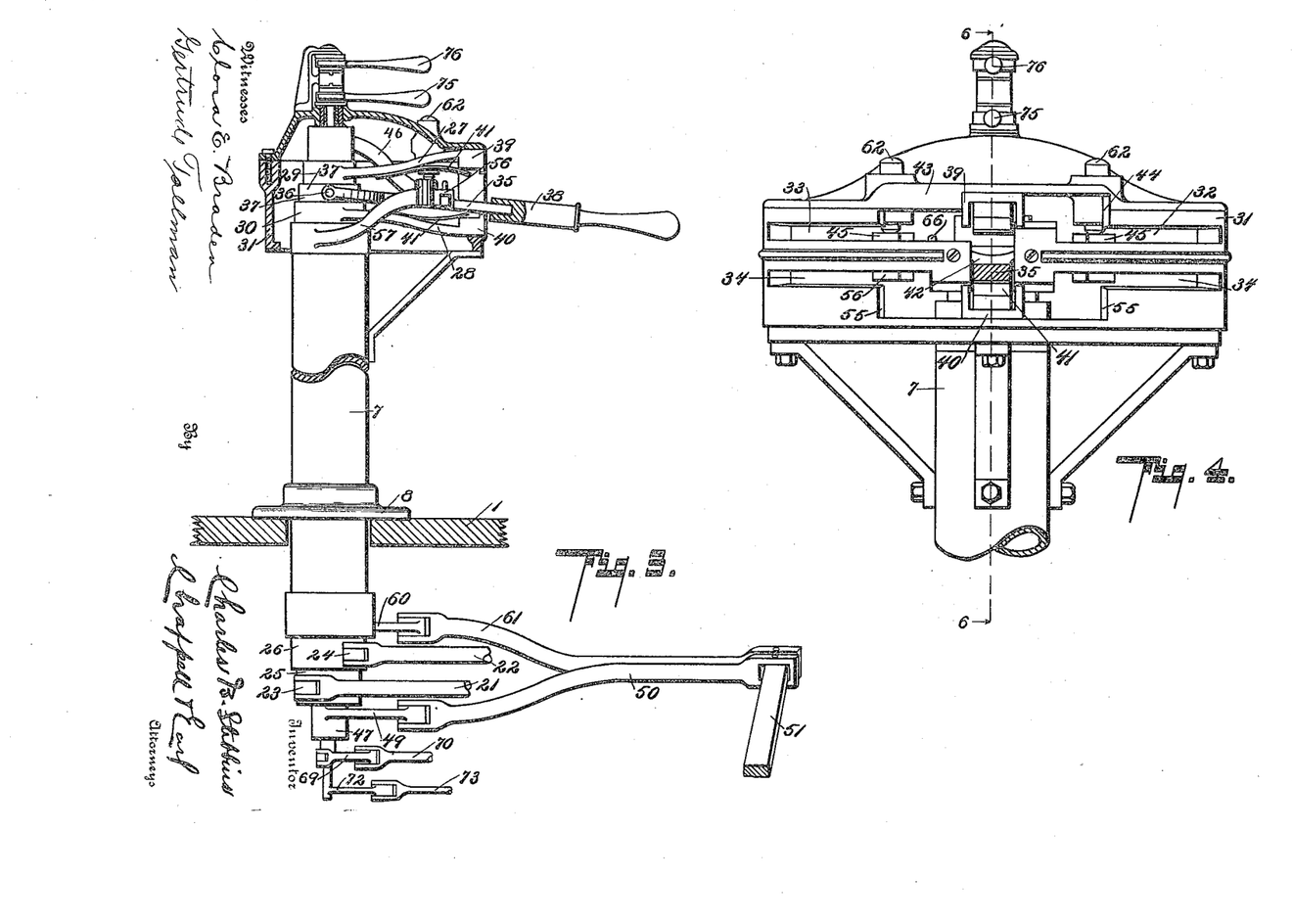
Fig. 4 is an enlarged detail elevation, sectioned on a line corresponding to line 4—4 of Fig. 1.
Fig. 6 is a detail vertical section taken on a line corresponding to line 6—6 of Fig. 4.

The control post 25 is provided with a lever 27 on its upper end, while the post rock shaft 26 is provided with a lever 28,—see Figs. 3 and 6. These posts or rock shafts are arranged one within the other. The lever 27 is connected to the post 25 by means of the sleeve 29, and the lever 28 is connected to the post 26 by means of the sleeve 30. These sleeves are provided with projecting bearing or bushing portions which serve to space and support the concentrically-arranged post tubes. By the shifting of these levers 27 and 28, the clutches, through the connections described, are actuated, the lever 28 being shifted in one direction to secure the high speed and in the other direction to secure the intermediate speed, while the lever 27 is shifted to secure the low speed, as described. These levers 27 and 28 are inclosed in the post head or casing 31, which has horizontal slot-like openings 32, 33 and 34—34, the openings 34 being of the same form and oppositely-arranged; whereas, the opening 33 is slightly modified, the purpose of which will be made clear as the description proceeds.

The levers 27 and 28 are shifted by means of the pivoted shifting lever 35, which is forked at its inner end and mounted on the pivots 36 carried by the revolubly-mounted collar 37. This shifting lever 35 is provided with a detachable handle 38 and may be swung into engagement with the jaws 39 and 40, respectively, of the levers 27 and 28, the jaws being faced oppositely, as clearly appears in Fig. 6, so that the shifting lever may be lifted upwardly into engagement with the jaw of the lever 27 and pushed down into the jaw of the lever 28. These levers are retained in their central position, in which position all of the transmission clutches are out of engagement, by means of catches preferably in the form of blade springs 41 which are secured to the levers and normally spring into the vertical slot 42 in the post head which connects the openings 32—33 and 34—34, thereby preventing the levers swinging into their actuating position. The lever 27, when in its inoperative position, rests against the shoulder 43 on the posthead,—see Figs. 4 and 5.

When it is desired to throw the lowspeed clutch of the transmission into engagement, the control lever is lifted upwardly into the jaw 39 of the lever 27, which releases the catch spring and the lever is swung over against the shoulder 44 of the slot 32, which actuates the rock shaft 9 through the connection described to throw the low speed transmission gear into operation.

The parts of my improved control are so arranged that the master clutch is always out of engagement while the transmission clutches are being shifted. To throw the master clutch into engagement, the lever 35 is dropped into engagement with the jaw 45 on the lever 46 of the master clutch control post or rock shaft 47 for controlling the master clutch, the arm being connected to the post by means of the sleeve 48,—see Fig. 6. The lower end of the control post 47 is provided with an arm 49 which is connected by means of the link 50 to the lever 51, which is pivoted at 52 on the frame. This lever is connected by the link 53 to the arm 54 on the master clutch controlling rock shaft 11. Through this connection, the master clutch is actuated. It will be obvious that it cannot be actuated until after the transmission clutch is in engagement.

In changing from the low to the intermediate or high speed, the controlling lever is swung back and engaged with the jaw 39 of the lever 27 and the lever swung back to its initial or inoperative position, which releases the low speed clutch, and the control lever is then swung down into engagement with the jaw 40 of the lever 28 and the lever swung to the right or left against one of the stops 55, thereby actuating the high or intermediate speed clutches, as desired, as the rock shaft 10 will be actuated through the connections described to throw either the high or the intermediate speed clutches into action. The master clutch is then thrown into engagement by lifting the shifting lever into engagement with the jaw 45 of the lever 46, if the lever 28 has been shifted to the right, and with the jaw 56 of the lever 57, if the movement has been to the left and swinging the master clutch actuating levers, as before. The lever, 57, is secured to the control post or rock shaft 58 by means of the collar 59. On the lower end of this post 58 is an arm 60, which is connected by the link 61 to the lever 51, so that the master clutch is actuated through either of these levers and through this connection of the links 61 and 50, so that the movement of one is transmitted to the other.

Figures 5, 6, 7:
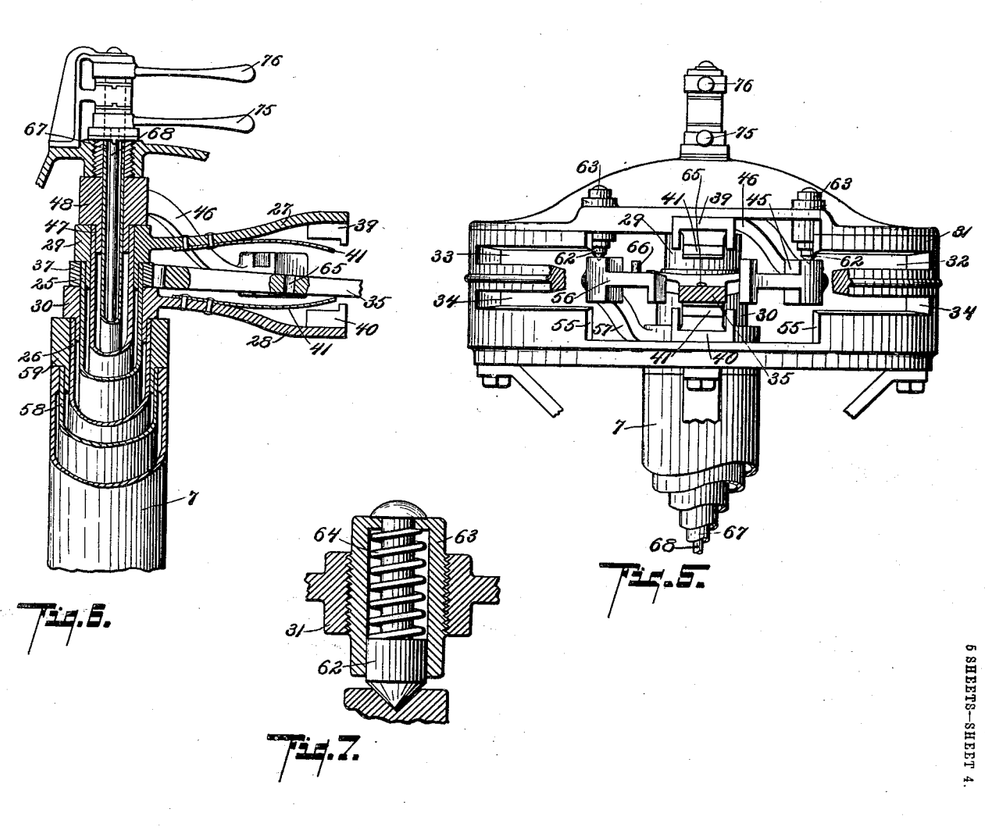
Fig. 5 is a corresponding view with parts broken away, the better to show their relation.
Fig. 7 is an enlarged detail vertical section, taken on a line corresponding to line 7—7 of Fig. 1, showing the locking pins for the master clutch control levers.

The levers are retained in their initial position by means of the spring stops 62, which are supported in suitable sockets 63, which are preferably threaded through the head 31, as illustrated in Fig. 7. On the stem of these stops are coiled springs 64, which hold them yieldingly downward.

When it is desired to throw the master clutch into engagement without actuating the transmission clutches, the control lever 35 is lifted up and turned to the left and the hole 65 engaged over the upwardly-projecting pin 66 on the arm 57, when, as will be obvious, the master clutch may be actuated without actuating any of the transmission clutches. It is desired to remark that if four speeds are used, by having the control post 9 actuate two clutches and forming the slot 33 the same as the slot 32, the lever 27 would actuate the two clutches the same as the lever 28 actuates the two.

I preferably control the throttle and the commutator by means of the control posts or rock shafts 67 and 68, the control post 67 being connected through the arm 69 and the link 70 to the lever 71 on the throttle valve, while the rock shaft 68 is connected to the arm 72 and the link 73 to the controlling lever 74 of the commutator 6.

The rock shaft 67 is provided with a hand lever 75, while the rock shaft 68 is provided with a hand lever 76. By this arrangement, I embody in compact form the entire controlling mechanism of the car, and the mechanism is so arranged that it is impossible to shift the same by accident to throw the transmission clutches into or out of engagement while the master clutch is in engagement.

To operate the car from either end, a duplicate of the mechanism here described is provided, the connection being made through the links 77 and 78 to the rock shaft arms 12 and 13, respectively, and through the link 79 to the rock shaft arm 54. As the arrangement to accomplish this end will be readily understood, it is not here illustrated.

Figure 8:
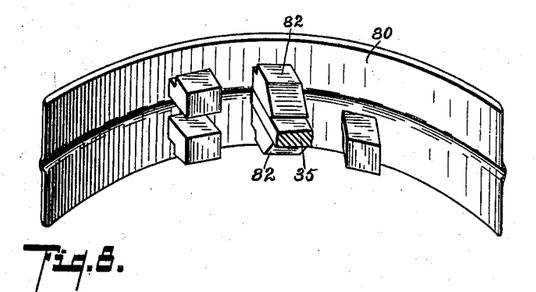
Fig. 8 is a perspective view of the closure or locking plate, which it is intended shall be used when the control mechanism at one end of the car is out of use, the closure or locking plate being designed to prevent the manipulation of the control and also to hold the locking means for the levers out of engagement so that they may be moved freely from the control at the other end of the car.
Figure 9:
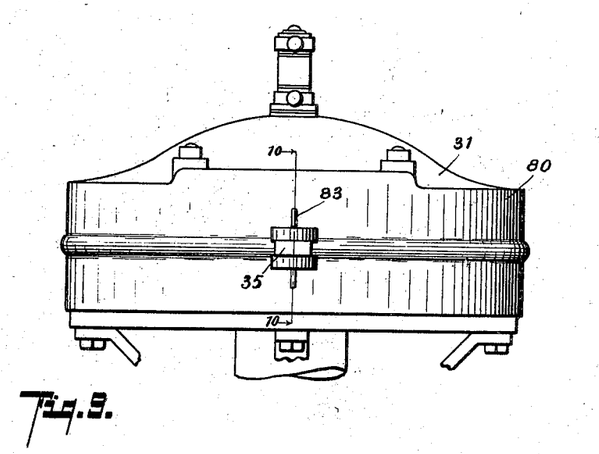
Fig. 9 is an elevation showing the plate attached or in position.
Figure 10:
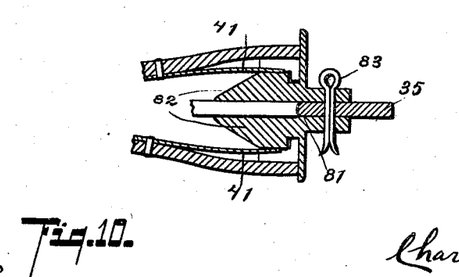
Fig. 10 is a detail vertical section taken on a line corresponding to line 10—10 of Fig. 9.

In order to prevent the locking springs 41 from acting when the mechanism is being controlled from the opposite end of the car, and also to prevent the manipulation of the mechanism by an unauthorized person, I provide a locking or closure plate 80,—see Figs. 8, 9 and 10,—which has an opening 81 adapted to receive the controlling lever 35, and inwardly-projecting lugs 82 adapted to hold the springs 41 out of their engaging position. The plate, as will be obvious, also will prevent any unauthorized person manipulating the control without removing the plate. Ordinarily, the plate is retained by means of a pin 83, which can be removed, as desired. The operator, in changing from one end of the car to the other, removes the spark and throttle levers 75 and 76, and the detachable handle 38 of the shifting lever 35 and attaches the locking plate. The levers are adapted for use on the other control.

I have illustrated and described my invention in detail in the form preferred by me, and in the form in which I have embodied it in practice, and as I find the same to be satisfactory. I am, however, aware that it can be greatly varied in structural details, but as these variations will readily appear to those skilled in the art to which this invention relates, I have not attempted to illustrate or describe them herein.

Having thus described my invention, what I claim as new and desire to secure by Letters Patent is:

1. The combination with a hollow control post standard, of a pair of transmission clutch control posts; a pair of master clutch control posts; a throttle control post; a commutator control post; said several control posts being arranged one within another and within said standard; collars on said posts having bearing portions whereby said posts are revolubly supported; actuating levers mounted upon said clutch control posts; a pivoted shifting lever; jaws on said actuating levers adapted to be engaged by said shifting lever; the jaws of said transmission post levers being faced oppositely and the jaws of said master clutch levers being adapted to be engaged from above and below; a head having guide ways therein for said shifting lever and stops for said transmission and master clutch levers; and said shifting lever arranged so that said master clutch levers are adapted, when in their initial positions, to be engaged by said shifting lever after the transmission clutch levers have been shifted thereby to their actuating position; and springs carried by said transmission control post levers for retaining them in their inoperative position, said springs being adapted to be disengaged by said shifting lever.

2. The combination with a hollow control post standard, of a pair of transmission clutch control posts; a pair of master clutch control posts; a throttle control post; a commutator control post, said several control posts being arranged one within another and within said standard; actuating levers mounted upon said clutch control posts; a pivoted shifting lever; jaws on said actuating levers adapted to be engaged by said shifting lever, the jaws of said transmission post levers being faced oppositely and the jaws of said master clutch levers being adapted to be engaged from above and below; a head having guide ways therein for said shifting lever and stops for said transmission and master clutch levers; and said shifting lever arranged so that said master clutch levers are adapted, when in their initial positions, to be engaged by said shifting lever after the transmission clutch levers have been shifted thereby to their actuating position; and springs carried by said transmission control post levers for retaining them in their inoperative position, said springs being adapted to be disengaged by said shifting lever.

3. The combination with a hollow control post standard, of a pair of transmission clutch control posts; a pair of master clutch control posts; a throttle control post; a commutator control post, said several control posts being arranged one within another and within said standard; collars on said posts having bearing portions whereby said posts are revolubly supported; actuating levers mounted upon said clutch control posts; a pivoted shifting lever; jaws on said actuating levers adapted to be engaged by said shifting lever, the jaws of said transmission post levers being faced oppositely and the jaws of said master clutch levers being adapted to be engaged from above and below; a head having guide ways therein for said shifting lever and stops for said transmission and master clutch levers and said shifting lever arranged so that said master clutch levers are adapted, when in their initial positions, to be engaged by said shifting lever after the transmission clutch levers have been shifted thereby to their actuating position.

4. The combination with a hollow control post standard, of a pair of transmission clutch control posts; a pair of master clutch control posts; a throttle control post; a commutator control post, said several control posts being arranged one within another and within said standard; actuating levers mounted upon said clutch control posts; a pivoted shifting lever; jaws on said actuating levers adapted to be engaged by said shifting lever, the jaws of said transmission post levers being faced oppositely and the jaws of said master clutch levers being adapted to be engaged from above and below; and a head having guide ways therein for said shifting lever and stops for said transmission lever arranged so that said master clutch levers are adapted, when in their initial positions, to be engaged by said shifting lever after the transmission clutch levers have been shifted thereby to their actuating position.

5. The combination with a hollow control post standard, of a pair of transmission clutch control posts; a pair of master clutch control posts, said control posts being arranged one within another and within said standard; collars on said posts having bearing portions whereby said posts are revolubly supported; actuating levers mounted upon said clutch control posts; a pivoted shifting lever; jaws on said actuating levers adapted to be engaged by said shifting lever, the jaws of said transmission post levers being faced oppositely and the jaws of said master clutch levers being adapted to be engaged from above and below; a head having guide ways therein for said shifting lever and stops for said transmission and master clutch levers and said shifting lever arranged so that said master clutch levers are adapted, when in their initial positions, to be engaged by said shifting lever after the transmission clutch levers have been shifted thereby to their actuating position; and springs carried by said transmission control post levers for retaining them in their inoperative position, said springs being adapted to be disengaged by said shifting lever.

6. The combination with a hollow control post standard, of a pair of transmission clutch control posts; a pair of master clutch control posts, said several control posts being arranged one within another and within said standard; actuating levers upon said clutch control posts; a pivoted shifting lever; jaws on said actuating levers adapted to be engaged by said shifting lever, the jaws of said transmission post levers being faced oppositely and the jaws of said master clutch levers being adapted to be engaged from above and below; a head having guide ways therein for said shifting lever and stops for said transmission and master clutch levers and said shifting levers arranged so that said master clutch levers are adapted, when in their initial positions, to be engaged by said shifting lever after the transmission clutch levers have been shifted thereby to their actuating position; and springs carried by said transmission control post levers for retaining them in their inoperative position, said springs being adapted to be disengaged by said shifting lever.

7. The combination with a hollow control post standard, of a pair of transmission clutch control posts; a pair of master clutch control posts, said several control posts being arranged one within another and within said standard; collars on said posts having bearing portions whereby said posts are revolubly supported; actuating levers mounted upon said clutch control posts; a pivoted shifting lever; jaws on said actuating levers adapted to be engaged by said shifting lever, the jaws of said transmission post levers being faced oppositely and the jaws of said master clutch levers being adapted to be engaged from above and below; a head having guide ways therein for said shifting lever and stops for said transmission and master clutch levers and said shifting lever arranged so that said master clutch levers are adapted, when in their initial positions, to be engaged by said shifting lever after the transmission clutch levers have been shifted thereby to their actuating position.

8. The combination with a hollow control post standard, of a pair of transmission clutch control posts; a pair of master clutch control posts, said several control posts being arranged one within another and within said standard; actuating levers mounted upon said clutch control posts; a pivoted shifting lever; jaws on said actuating levers adapted to be engaged by said shifting lever, the jaws of said transmission post levers being faced oppositely and the jaws of said master clutch levers being adapted to be engaged from above and below; and a head having guide ways therein for said shifting lever and stops for said transmission and master clutch levers and said shifting lever arranged so that said master clutch levers are adapted, when in their initial positions, to be engaged by said shifting lever after the transmission clutch levers have been shifted thereby to their actuating position.

9. The combination of a plurality of transmission clutch control levers; a plurality of master clutch control levers; a shifting lever adapted to be engaged with said control levers for shifting the same; a head having guide ways therein for said shifting lever and stops for said transmission and master clutch levers and said shafting lever arranged so that said master clutch levers are adapted, when in their initial positions, to be engaged by said shifting lever after the transmission clutch levers have been shifted thereby to their actuating position; and catches for retaining said levers in their inoperative position, said catches being adapted to be disengaged by said shifting lever.

10. The combination of a plurality of transmission clutch control levers; a plurality of master clutch control levers; a shifting lever adapted to be engaged with said control levers for shifting the same; a head having guide ways therein for said shifting lever and stops for said transmission and master clutch levers and said shifting lever arranged so that said master clutch levers are adapted, when in their initial positions, to be engaged by said shifting lever after the transmission clutch levers have been shifted thereby to their actuating position.

11. The combination of a plurality of transmission clutch control levers; a plurality of master clutch control levers; a shifting lever adapted to be engaged with said control levers for shifting the same; stops for said transmission and master clutch levers and said shifting lever arranged so that said master clutch levers are adapted, when in their initial positions, to be engaged by said shifting lever after the transmission clutch levers have been shifted thereby to their actuating position; and catches for retaining said levers in their inoperative position, said catches being adapted to be disengaged by said shifting lever.

12. The combination of a plurality of transmission clutch control levers; a plurality of master clutch control levers; a shifting lever adapted to be engaged with said control levers for shifting the same; and stops for said transmission and master clutch levers and said shifting lever arranged so that said master clutch levers are adapted, when in their initial positions, to be engaged by said shifting lever after the transmission clutch levers have been shifted thereby to their actuating position.

13. The combination with a hollow control post standard, of a plurality of control posts, said several control posts being arranged one within another and within said standard; actuating levers mounted upon said posts; a shifting lever adapted to be engaged with said control post levers; a head having guide ways therein for said shifting lever and stops for said control post levers, a part of said guide ways being provided with a plurality of stops whereby a plurality of control levers may be successively adjusted by a single stroke of the said shifting lever; and catches for retaining said control levers in their inoperative position, said catches being adapted to be disengaged by said shifting lever.

14. The combination with a hollow control post standard, of a plurality of control posts, said several control posts being arranged one within another and within said standard; actuating levers mounted upon said posts, said levers being arranged in sets, the levers of the sets being adapted to be successively shifted to and from their actuating positions; a shifting lever adapted to be engaged with said control post levers; and catches for retaining said control levers in their inoperative position, said catches being adapted to be disengaged by said shifting lever.

15. The combination with a hollow control post standard, of a plurality of control posts, said several control posts being arranged one within another and within said standard; actuating levers mounted upon said posts; a shifting lever adapted to be engaged with said control post levers; and a head having guide ways therein for said shifting lever and stops for said control post levers, a part of said guide ways being provided with a plurality of stops whereby a plurality of control levers may be successively adjusted by a single stroke of the said shifting lever.

16. The combination of a plurality of control levers arranged to be successively shifted to and from their actuating positions; a shifting lever adapted to be engaged successively with said control levers, the actuating position of one control lever being in substantially the same plane as the inoperative position of the other so that the shifting lever may be readily disengaged from one and engaged with the other.

17. The combination of a plurality of control levers arranged to be shifted successively to and from their actuating positions; a shifting lever adapted to be engaged with said control levers; a head having guide ways therein for said shifting lever and stops for said control levers; and catches for retaining said control levers in their inoperative position, said catches being adapted to be disengaged by said shifting lever.

18. The combination of a transmission clutch control lever; a master clutch control lever; and a pivoted shifting lever adapted to be successively engaged with said control levers for shifting the same to and from their actuating position, said levers being arranged so that said master clutch control lever is in position to be engaged by said shifting lever after the transmission clutch lever has been shifted thereby to its actuating position.

19. The combination of a transmission clutch control lever; a master clutch control lever; a pivoted shifting lever adapted to be engaged with said control levers for shifting the same; a head having guide ways therein for said shifting lever and stops for said transmission and master clutch levers and said shifting lever arranged so that said master clutch lever is adapted, when in its initial position, to be engaged by said shifting lever after the transmission clutch lever has been shifted thereby to its actuating position; and catches for retaining said transmission clutch lever in its inoperative position, said catches being adapted to be disengaged by said shifting lever.

20. The combination of a transmission clutch control lever; a master clutch control lever; a pivoted shifting lever adapted to be engaged with said control levers for shifting the same; stops for said transmission and master clutch levers and said shifting lever arranged so that said master clutch lever is adapted, when in its initial position, to be engaged by said shifting lever after the transmission clutch lever has been shifted thereby to its actuating position; and catches for retaining said transmission clutch lever in its inoperative position, said catches being adapted to be disengaged by said shifting lever.

21. The combination of a transmission clutch control lever; a master clutch control lever; a pivoted shifting lever adapted to be engaged with said control levers for shifting the same; said levers being arranged so that said master clutch control lever is in position to be engaged by said shifting lever after said transmission control lever has been shifted to its actuating position thereby; and catches for retaining said transmission clutch lever in its inoperative position, said catches being adapted to be disengaged by said shifting lever.

22. The combination of a transmission clutch control lever; a master clutch control lever; a pivoted shifting lever adapted to be engaged with said control levers for shifting the same; and a head having guide ways therein for said shifting lever and stops for said transmission and master clutch levers and said shifting lever arranged so that said master clutch lever is adapted, when in its initial position, to be engaged by said shifting lever after the transmission clutch lever has been shifted thereby to its actuating position.

23. The combination with a pair of transmission clutch shifting rock shafts, a master clutch shifting rock shaft, a throttle lever, and a commutator lever, of a hollow control post standard; a pair of transmission clutch control posts; a pair of master clutch control posts; a throttle control post; a commutator control post, said several control posts being arranged one within another and within said standard, said posts being graduated in length so that each projects at each end from the next outer post; actuating levers mounted upon the upper ends of said posts; a shifting lever adapted to be engaged with said control post levers; connections for the lower ends of said transmission control posts to said transmission rock shafts; connections for the lower ends of said master clutch rock shaft to said master clutch control posts comprising arms on said control posts and rock shaft, a pivoted lever, a connecting link for said lever to said arm on said rock shaft; and a pair of connecting links for said pivoted lever to said arms on said control posts and connections for said throttle and commutator levers to said throttle and commutator posts.

24. The combination with a pair of transmission clutch shifting rock shafts, a master clutch shifting rock shaft, of a hollow control post standard; a pair of transmission clutch control posts; a pair of master clutch control posts, said several control posts being arranged one within another and within said standard, said posts being graduated in length so that each projects at each end from the next outer post; actuating levers mounted upon the upper ends of said posts; a shifting lever adapted to be engaged with said control post levers; connections for the lower ends of said transmission control posts to said transmission rock shafts; connections for the lower ends of said master clutch rock shaft to said master clutch control posts comprising arms on said control posts and rock shaft, a pivoted lever, a connecting link for said lever to said arm on said rock shaft; and a pair of connecting links for said pivoted lever to said arms on said control posts.

25. The combination with a plurality of transmission clutch shifting rock shafts, of a master clutch shifting rock shaft; a plurality of transmission clutch control posts; a plurality of master clutch control posts, said several posts being arranged one within another; actuating levers mounted upon said posts; a shifting lever adapted to be engaged with said control post levers; connections for said transmission control posts to said transmission rock shafts comprising arms on said rock shafts and said control posts, a pair of pivoted levers, and connections for said levers to said arms on said control posts and rock shafts; connections for said master clutch rock shaft to said master clutch control posts comprising arms on said control posts and rock shaft, a pivoted lever, a connecting link for said lever to said arm on said rock shaft, and a pair of connecting links for said pivoted lever to said arms on said control posts.

26. The combination with a plurality of transmission clutch shifting rock shafts, of a master clutch shifting rock shaft; a plurality of transmission clutch control posts; a plurality of master clutch control posts, said several posts being arranged one within another; actuating levers mounted upon said posts; a shifting lever adapted to be engaged with said control post levers; connections for said transmission control posts to said transmission rock shafts comprising arms on said rock shafts and said control posts, a pair of pivoted levers, and connections for said levers to said arms on said control posts and rock shafts; and connections for said master clutch rock shaft to said master clutch control posts.

27. The combination with a plurality of transmission clutch shifting rock shafts, of a master clutch shifting rock shaft; a plurality of transmission clutch control posts; a plurality of master clutch control posts, said several posts being arranged one within another; actuating levers mounted upon said posts; a shifting lever adapted to be engaged with said control post levers; connections for said transmission control posts to said transmission rock shafts; connections for said master clutch rock shaft to said master clutch control posts comprising arms on said control posts and rock shaft, a pivoted lever, a connecting link for said lever to said arm on said rock shaft, and a pair of connecting links for said pivoted lever to said arms on said control posts.

28. The combination with a plurality of transmission clutch shifting rock shafts, of a master clutch shifting rock shaft; a plurality of transmission clutch control posts; a plurality of master clutch control posts, said several posts being arranged one within another; actuating levers mounted upon said posts; a shifting lever adapted to be engaged with said control post levers; connections for said transmission control posts to said transmission rock shafts; and connections for said master clutch rock shaft to said clutch control posts.

29. The combination with a plurality of transmission clutch shifting rock shafts, a master clutch shifting rock shaft, a throttle lever, and a commutator lever, of a plurality of transmission clutch control posts; a plurality of master clutch control posts; a throttle control post; a commutator post; actuating levers mounted upon said posts; a shifting lever adapted to be engaged with said levers; stops for said transmission and master clutch levers and said shifting lever arranged so that said master clutch levers are adapted, when in their initial positions, to be engaged by said shifting lever after the transmission clutch levers have been shifted thereby to their actuating position; catches for retaining said post control levers in their inoperative position, said catches being adapted to be disengaged by said shifting lever; connections for said transmission control posts to said transmission rock shafts; connections for said master clutch rock shaft to said master clutch control posts; and connections for said throttle and commutator levers to said throttle and commutator posts.

30. The combination with a plurality of transmission clutch shifting rock shafts, a master clutch shifting rock shaft, a throttle lever, and a commutator lever, of a plurality of transmission clutch control posts; a plurality of master clutch control posts; a throttle control post; a commutator post; actuating levers mounted upon said posts; a shifting lever adapted to be engaged with said levers; connections for said transmission control posts to said transmission rock shafts; connections for said master clutch rock shaft to said master clutch control posts; and connections for said throttle and commutator levers to said throttle and commutator posts.

31. The combination with a plurality of transmission clutch shifting rock shafts; a master clutch shifting rock shaft, of a plurality of transmission clutch control posts; a plurality of master clutch control posts; actuating levers mounted upon said posts; a shifting lever adapted to be engaged with said levers; stops for said transmission and master clutch levers and said shifting lever arranged so that said master clutch levers are adapted, when in their initial positions, to be engaged by said shifting lever after the transmission clutch levers have been shifted thereby to their actuating positions; catches for retaining said post control posts in their inoperative position, said catches being adapted to be disengaged by said shifting lever; connections for said transmission control posts to said transmission rock shafts; and connections for said master clutch rock shaft to said master clutch control posts.

32. The combination with a plurality of transmission clutch shifting rock shafts, a master clutch shifting rock shaft, of a plurality of transmission clutch control posts; a plurality of master clutch control posts; actuating levers mounted upon said posts; a shifting lever adapted to be engaged with said levers; stops for said transmission and master clutch levers and said shifting lever arranged so that said master clutch levers are adapted, when in their initial positions, to be engaged by said shifting lever after the transmission clutch levers have been shifted thereby to their actuating position; connections for said transmission control posts to said transmission rock shafts; and connections for said master clutch rock shaft to said master clutch control posts.

33. The combination with a plurality of transmission clutch shifting rock shafts, a master clutch shifting rock shaft, of a plurality of transmission clutch control posts; a plurality of master clutch control posts; actuating levers mounted upon said posts; a shifting lever adapted to be engaged with said levers; catches for retaining said post control levers in their inoperative position, said catches being adapted to be disengaged by said shifting lever; connections for said transmission control posts to said transmission rock shafts; and connections for said master clutch rock shaft to said master clutch control posts.

34. The combination with a plurality of transmission clutch shifting rock shafts, a master clutch shifting rock shaft, of a plurality of transmission clutch control posts; a plurality of master clutch control posts; actuating levers mounted upon said posts; a shifting lever adapted to be engaged with said levers; connections for said transmission control posts to said transmission rock shafts; and connections for said master clutch rock shaft to said master clutch control posts.

35. The combination of a plurality of transmission control levers; a plurality of master clutch control levers; a shifting lever adapted to be engaged by said control levers; a head having guide ways therein for said shifting lever; catches for said transmission control levers; and a closure plate adapted to retain said shifting lever and said catches in their inoperative position and to prevent the manipulation of said master clutch control levers.

36. The combination of a plurality of transmission control levers; a plurality of master clutch control levers; a shifting lever adapted to be engaged by said control levers; catches for said transmission control levers; and a closure plate adapted to retain said shifting lever and said catches in their inoperative position and to prevent the manipulation of said master clutch control levers.

37. The combination of a control lever; a shifting lever adapted to be engaged by said control lever; a head having guide ways therein for said shifting lever; a catch for said control lever; and a closure plate adapted to retain said shifting lever and said catch in their inoperative position.

38. The combination of a control lever; a shifting lever adapted to be engaged by said control lever; a catch for said control lever; and a closure plate adapted to retain said shifting lever and said catch in their inoperative position.

In witness whereof, I have hereunto set my hand and seal in the presence of two witnesses.

CHARLES B. STEBBINS. [L. S.]

Witnesses:
CHARLES G. MAHANA,
ORLEY R. BAIRD.